(12) United States Patent
Hedrick et al.

(10) Patent No.: US 8,013,065 B2
(45) Date of Patent: Sep. 6, 2011

(54) METHODS FOR MAKING MULTI-BRANCHED POLYMERS

(75) Inventors: James L. Hedrick, Pleasanton, CA (US); Eric Appel, Palo Alto, CA (US); Robert D. Miller, San Jose, CA (US); Fredrik Nederberg, Greenville, DE (US); Robert M. Waymouth, Palo Alto, CA (US)

(73) Assignees: International Business Machines Corporation, Armonk, NY (US); The Board of Trustees of the Leland Stanford Junior University, Palo Alto, CA (US)

( * ) Notice: Subject to any disclaimer, the term of this patent is extended or adjusted under 35 U.S.C. 154(b) by 39 days.

(21) Appl. No.: 12/481,477

(22) Filed: Jun. 9, 2009

(65) Prior Publication Data

US 2010/0311917 A1    Dec. 9, 2010

(51) Int. Cl.
*C08F 8/00* (2006.01)

(52) U.S. Cl. ........ 525/107; 525/165; 525/403; 525/410; 525/415; 525/418; 525/437; 525/439; 525/452; 525/461; 525/471; 525/538; 525/540

(58) Field of Classification Search ................... 525/461, 525/452, 418, 410, 415, 538, 540, 471, 437, 525/439, 403, 107, 165
See application file for complete search history.

(56) References Cited

U.S. PATENT DOCUMENTS

| | | | |
|---|---|---|---|
| 6,114,458 | A | 9/2000 | Hawker et al. |
| 6,664,331 | B2 | 12/2003 | Harris et al. |
| 6,699,724 | B1 | 3/2004 | West et al. |
| 6,730,334 | B2 | 5/2004 | Zhao |
| 6,838,528 | B2 | 1/2005 | Zhao |
| 7,265,186 | B2 | 9/2007 | Zhao |
| 2007/0160561 | A1 | 7/2007 | Ouali et al. |
| 2008/0114128 | A1 | 5/2008 | Destarac et al. |
| 2010/0015433 | A1 | 1/2010 | Arfsten et al. |

OTHER PUBLICATIONS

R.H. Müller et al., "Nanosuspensions as Particulate Drug Formulations in Therapy Rationale for Development and What We Can Expect for the Future," *Advanced Drug Delivery Reviews* 47 (2001) pp. 3-19.
Olivier Coulembier et al., "A Distinctive Organocatalytic Approach to Complex Macromolecular Architectures," *Angew. Chem. Int. Ed.* 2007, 46, pp. 4719-4721.
Hartmuth C. Kolb et al., "Click Chemistry: Diverse Chemical Function From a Few Good Reactions," *Angew. Chem. Int. Ed.* 2001, 40, pp. 2004-2021.
Caroline M. Spencer et al., "Paclitaxel: A Review of its Pharmacodynamic and Pharmacokinetic Properties and Therapeutic Potential in the Treatment of Cancer," *Drugs* 48(5); pp. 794-847 (1994).

Raymond H. Weiss et al., "Hypersensitivity Reactions from Taxol," *Journal of Clinical Oncology*, vol. 8, No. 7 (Jul. 1990) pp. 1263-1268.
Cigdem Celik et al., "Synthesis of Miktoarm Star and Miktoarm Star Block Copolymers via a Combination of Atom Transfer Radical Polymerization and Stable Free-Radical Polymerization," *Journal of Polymer Science: Part A: Polymer Chemistry*, vol, 41 (2003) pp. 2542-2548.
N. Hadjichristidis et al., "Morphology and Miscibility of Miktoarm Styrene-Diene Copolymers and Terpolymers," *Macromolecules*, 1993, 26, pp. 5812-5815.
V. Percec et al., "Controlling Polymer Shape Through the Self-Assembly of Dendritic Side-Groups," *Nature*, vol. 391 (Jan. 8, 1998) pp. 161-164.
Ning Kang et al., "Stereocomplex Block Copolymer Micelles: Core-Shell Nanostructures With Enhanced Stability," *Nano Letters*, 2005, vol. 5, No. 2, pp. 315-319.
Li Chen et al., "Enantiomeric PLA-PEG Block Copolymers and Their Stereocomplex Micelles Used as Rifampin Delivery," *Journal of Nanoparticle Research* (2007) 9, pp. 777-785.
T. Riley et al., "Physicochemical Evaluation of Nanoparticles Assembled From Poly(lactic acid)-Poly(ethylene glycol) (PLA-PEG) Block Copolymers as Drug Delivery Vehicles," *Langmuir* 2001, 17, pp. 3168-3174.
P. Mansky et al., "Controlling Polymer-Surface Interactions With Random Copolymer Brushes," *Science*, vol. 275 (Mar. 7, 1997) pp. 1458-1460.
S.I. Stupp et al., "Supramolecular Materials: Self-Organized Nanostructures," *Science*, vol. 276 (Apr. 18, 1997) pp. 384-389.
Zhibo Li et al., "Multicompartment Micelles From ABC Miktoarm Stars in Water," *Science*, vol. 306 (Oct. 1, 2004) pp. 98-101.
Craig J. Hawker et al., "The Convergence of Synthetic Organic and Polymer Chemistries," *Science*, vol. 309 (Aug. 19, 2005) pp. 1200-1205.
Chiu-Wing Lam et al., "Pulmonary Toxicity of Single-Wall Carbon Nanotubes in Mice 7 and 90 Days After Intratracheal Instillation," *Toxicological Sciences*, 77, pp. 126-134 (2004).
Teddie Magbitang et al., "Oriented Nanoporous Lamellar Organosilicates Templated From Topologically Unsymmetrical Dendritic-Linear Block Copolymers," *Angew. Chem. Int. Ed.*, 2005, 44, pp. 7574-7580.
Thomas M. Hermans et al., "Application of Solvent-Directed Assembly of Block Copolymers to the Synthesis of Nanostructured Materials With Low Dielectric Constants," *Angew. Chem. Int. Ed.*, 2006, 45, pp. 6648-6652.

(Continued)

*Primary Examiner* — David Wu
*Assistant Examiner* — Robert Jones
(74) *Attorney, Agent, or Firm* — Shumaker & Sieffert, P.A.

(57) ABSTRACT

A method for making a multi-branched polymer includes reacting a first polymeric unit with a functional cyclic compound to form a functional macroinitiator compound with a cyclic moiety. The functional macroinitiator compound is reacted with an amine functional compound to open the cyclic moiety and form a first functional group and a second functional group. To form the branched polymer, at least one of a second polymeric unit is propagated from the first functional group and a third polymeric unit is propagated from the second functional group.

22 Claims, 3 Drawing Sheets

OTHER PUBLICATIONS

Darcy A. Culkin et al., "Zwitterionic Polymerization of Lactide to Cyclic Poly(Lactide) by Using N-Heterocyclic Carbene Organocatalysts," *Angew. Chem. Int. Ed.*, 2007, 46, pp. 2627-2630.

Fredrik Nederberg et al., "New Ground for Organic Catalysis: A Ring-Opening Polymerization Approach to Hydrogels," *Biomacromolecules*, 2007, 8, pp. 3294-3297.

Russell C. Pratt et al., "Tagging Alcohols With Cyclic Carbonate: A Versatile Equivalent of (Meth)acrylate for Ring-Opening Polymerization," *Chem. Commun.*, 2008, pp. 114-116.

Craig J. Hawker et al., "New Polymer Synthesis by Nitroxide Mediated Living Radical Polymerizations," *Chem. Rev.*, 2001, 101, pp. 3661-3688.

Nahrain E. Kamber et al., "Organocatalytic Ring-Opening Polymerization," *Chem. Rev.*, 2007, 107, pp. 5813-5840.

Sung Chul Kim et al., "Investigation of the Release Behavior of DEHP From Infusion Sets by Paclitaxel-Loaded Polymeric Micelles," *International Journal of Pharmaceutics*, 293 (2005) pp. 303-310.

Eric F. Connor et al., "First Example of N-Heterocyclic Carbenes as Catalysts for Living Polymerization: Organocatalytic Ring-Opening Polymerization of Cyclic Esters," *J. Am. Chem. Soc.*, vol. 124, No. 6, 2002, pp. 914-915.

Anton W. Bosman et al., "A Modular Approach Toward Functionalized Three-Dimensional Macromolecules: From Synthetic Concepts to Practical Applications," *J. Am. Chem. Soc.*, 2003, 125, pp. 715-728.

Byoung-Ki Cho et al., "Nanohybrids From Liquid Crystalline Extended Amphiphilic Dendrimers," *J. Am. Chem. Soc.*, 2004, 126, pp. 4070-4071.

Zhyiun Chen et al., "Unique Toroidal Morphology From Composition and Sequence Control of Triblock Copolymers," *J. Am. Chem. Soc.*, 2005, 127, pp. 8592-8593.

Andrew P. Dove et al., "Thiourea-Based Bifunctional Organocatalysis: Supramolecular Recognition for Living Polymerization," J. Am. Chem. Soc., 2005, 127, pp. 13798-13799.

Russell C. Pratt et al., "Triazabicyclodecene: A Simple Bifunctional Organocatalyst for Acyl Transfer and Ring-Opening Polymerization of Cyclic Esters," *J. Am. Chem. Soc.*, 2006, 128, pp. 4556-4557.

Andrew P. Goodwin et al., "Rapid, Efficient Synthesis of Heterobifunctional Biodegradable Dendrimers," *J. Am. Chem. Soc.*, 2007, 129, pp. 6994-6995.

Wonhee Jeong et al., "Organic Spirocyclic Initiators for the Ring-Expansion Polymerization of β-Lactones," *J. Am. Chem. Soc.*, 2007, 129, pp. 8414-8415.

Lei Zhang et al., "Organocatalytic Stereoselective Ring-Opening Polymerization of Lactide With Dimeric Phosphazene Bases," *J. Am. Chem. Soc.*, 2007, 129, pp. 12610-12611.

Osamu Sega et al., "Thermosensitive and Biodegradable Polymeric Micelles for Paclitaxel Delivery," *Journal of Controlled Release*, 103 (2005) pp. 341-353.

Anupama Potineni et al., "Poly(ethylene oxide)-modified Poly(β-amino ester) Nanoparticles as a pH-Sensitive Biodegradable System for Paclitaxel Delivery," *Journal of Controlled Release*, 86 (2003) pp. 223-234.

Tuba Erdogan et al., "Photoresponsive Poly(methyl methacrylate)$_2$-(Polystyrene)$_2$ Miktoarm Star Copolymer Containing an Azobenzene Moiety at the Core," *Journal of Polymer Science: Part A: Polymer Chemistry*, vol, 44, pp. 1396-1403 (2006).

Hakan Durmaz et al., "Heteroarm H-Shaped Terpolymers Through the Combination of the Diels-Alder Reaction and Controlled/Living Radical Polymerization Techniques," *Journal of Polymer Science: Part A: Polymer Chemistry*, vol. 44, pp. 3947-3957 (2006).

Mikael Trollsås et al., "Hyperbranched Poly(ε-caprolactone)s," *Macromolecules*, 1998, 31, pp. 3439-3445.

J. L. Hedrick et al., "Dendrimer-like Star Block and Amphiphilic Copolymers by Combination of Ring Opening and Atom Transfer Radical Polymerization," *Macromolecules*, 1998, 31, pp. 8691-8705.

Andreas Heise et al., "Starlike Polymeric Architectures by Atom Transfer Radical Polymerization; Templates for the Production of Low Dielectric Constant Thin Films," *Macromolecules*, 2000, 33, pp. 2346-2354.

S.A. Krouse et al., "Stereocomplex Formulation Between Enantiomeric Poly(lactides)," *Macromolecules*, 1987, 20, pp. 904-906.

Tao He et al., "Synthesis of ABC 3-Miktoarm Star Terpolymers From a Trifunctional Initiator by Combining Ring-Opening Polymerization, Atom Transfer Radical Polymerization, and Nitroxide-Mediated Radical Polymerization," *Macromolecules*, 2004, 37, pp. 3128-3135.

J. Rieger et al., "Controlled Synthesis of an ABC Miktoarm Star-Shaped Copolymer by Sequential Ring-Opening Polymerization of Ethylene Oxide, Benzyl β-Malolactonate, and ε-Caprolactone," *Macromolecules*, 2005, 38, pp. 10650-10657.

Haifeng Gao et al., "Synthesis of Miktoarm Star Polymers Via ATRP Using the "In-Out" Method: Determination of Initiation Efficiency of Star Macroinitiators," *Macromolecules*, 2006, 39, pp. 7216-7223.

Russell C. Pratt et al., "Exploration, Optimization, and Application of Supramolecular Thiourea-Amine Catalysts for the Synthesis of Lactide (Co)polymers," *Macromolecules*, 2006, 39, pp. 7863-7871.

Erik M. Freer et al., "Oriented Mesoporous Organosilicate Thin Films," *Nano Letters*, vol. 5, No. 10 (2005) pp. 2014-2018.

Jeongsoo Choi et al., "Monolayered Organosilicate Toroids and Related Structures: A Phase Diagram for Templating From Block Copolymers," *Nano Letters*, vol. 6, No. 8 (2006) pp. 1761-1764.

Nikos Hadjichristidis et al., "Miktoarm Star Polymers," Polymeric Materials Encyclopedia, 1996, 6, pp. 4398-4406.

Guohua Deng et al., "Synthesis of ABC-Type Miktoarm Star Polymers by 'Click' Chemistry, ATRP and ROP," *European Polymer Journal*, 43 (2007) pp. 1179-1187.

Nederberg et al., "Simple Approach to Stabilized Micelles Employing Miktoarm Terpolymers and Stereocomplexes with Application in Paclitaxel Delivery," Biomacromolecules 2009, vol. 10, No. 6, 1460-1468, Published in print Jun. 2009, Published on the Web Apr. 22, 2009.

Tadeusz Biela et al., "One-Pot Synthesis of Star-Shaped Aliphatic Polyesters with Hyperbranched Cores and Their Characterization with Size Exclusion Chromatography," Journal of Polymer Science Part A: Polymer Chemistry, vol. 44, (2006), pp. 4214-4221.

Didier Bourissou et al., "Recent advances in the controlled preparation of poly(a-hydroxy acids): Metal-free catalysts and new monomers," Comptes Rendus Chimie, vol. 10, (2007), pp. 775-794.

Olivier Coulembier et al., "From controlled ring-opening polymerization to biodegradable aliphatic polyester: Especially poly(b-malic acid) derivatives," Progress in Polymer Science, vol. 31, (2006), pp. 723-747.

Andrew P. Dove, "Controlled ring-opening polymerisation of cyclic esters: polymer blocks in self-assembled nanostructures," Chem. Commun., 2008, pp. 6446-6470.

Christine Jerome et al., "Recent advances in the synthesis of aliphatic polyesters by ring-opening polymerization," Advanced Drug Delivery Reviews, vol. 60 (2008), pp. 1056-1076.

Nahrain Kamber et al., "N-Heterocyclic Carbenes for the Organocatalytic Ring-Opening Polymerization of #-Caprolactone," Macromolecules, 2009, 42(5), pp. 1634-1639.

Ryan J. Pounder et al., "Metal free thiol-maleimide 'Click' reaction as a mild functionalisation strategy for degradable polymers", Chem. Commun., 2008, pp. 5158-5160.

Michal Radowski et al., "Supramolecular Aggregates of Dendritic Multishell Architectures as Universal Nanocarriers," Angew. Chem. Int. Ed. 2007, 46, pp. 1265-1269.

James T. Wiltshire et al., "Degradable Core Cross-Linked Star Polymers via Ring-Opening Polymerization", Macromolecules, 2006, 39 (13), pp. 4282-4285.

Meng-Hua Xiong et al., "Synthesis of PEG-Armed and Polyphosphoester Core-Cross-Linked Nanogel by One-Step Ring-Opening Polymerization," Macromolecules, 2009, 42 (4), pp. 893-896.

METHODS FOR MAKING MULTI-BRANCHED POLYMERS

STATEMENT REGARDING FEDERALLY SPONSORED RESEARCH AND DEVELOPMENT

This invention was made with Government support under contracts CHE-064891 and DMR-0213618 awarded by the National Science Foundation. The U.S. Government has certain rights in this invention.

TECHNICAL FIELD

The present disclosure relates to methods for making multi-branched macromolecules. In some embodiments, the macromolecules generate nanostructured materials with properties that can be tailored for site-specific delivery of biologically active agents.

BACKGROUND

Highly potent biologically active agents, such as, for example, anticancer drugs and genes, can kill healthy and diseased cells indiscriminately. Therefore, if these biologically active agents are to be most effective against their intended cellular targets without causing adverse patient reactions and/or toxicity, a macromolecular delivery vehicle should transport the agents to a specific desired site.

Complex polymers can be prepared with controlled functionality and architecture for delivery of biologically active agents. However, the biological activities (e.g., toxicity and efficacy) of the biologically active agents can vary widely depending on the molecular weight and surface structure of the polymeric delivery vector. It can be difficult to prepare a complex polymer of a desired size that responds in a predictable way to a particular drug and/or gene, and it is difficult to fully utilize the functionality of such compounds.

The hydrophobic core or the hydrophilic shell of micelles made from amphiphilic copolymers can enclose and immobilize biologically active agents, protecting the agents from uptake by the immune system, and enhancing their bioavailability and biodistribution. In addition, a biological signal can be chemically conjugated onto the surface of the micelles to target specific tissues or cells within the body. However, currently available micelles are difficult to make in a desired size, structurally dynamic, and have low critical micelle concentrations. As a result, their capacity to load and transport biologically active agents can be limited.

SUMMARY

New synthetic methodologies are disclosed to make macromolecules with well-defined molecular weights and surface structures. The present disclosure is directed to a method for generating multi-branched co- or ter-polymers from a cyclic macroinitiator compound. In this method a first polymer (A) is coupled with a cyclic compound to form a cyclic macroinitiator compound. The cyclic moiety on the cyclic macroinitiator compound is then opened with a functional amine compound to generate a macrogenerator compound with two different functional groups. At least one of the functional groups on the macrogenerator compound can be coupled with other polymers using a wide variety of polymerization processes such as, for example, ring opening polymerization (ROP), nitroxide mediated polymerization (NMP), or a combination thereof. In this method two (AB) or three (ABC) polymeric units can be joined together and propagate outwardly from a central core of the macrogenerator compound. The properties of the resulting co- (AB) and ter- (ABC) polymers can be controlled by selection of the functional groups in the respective branches.

The synthetic methods described in this disclosure may be used to make a wide variety of complex co- and ter-polymers. These methods are both simple and versatile, and the clean and quantitative transformations at each polymerization step provide co- and ter-polymers with predictable molecular weights and end-group fidelity. The discussion below will exemplify the synthesis of complex biocompatible multi-branched polymeric materials.

In one embodiment, the present disclosure is directed to a method for making a multi-branched polymer, including reacting a first polymeric unit with a functional cyclic compound to form a functional macroinitiator compound with a cyclic moiety. The functional macroinitiator compound is reacted with an amine functional compound to open the cyclic moiety and form a first functional group and a second functional group. To form the branched polymer, at least one of a second polymeric unit is propagated from the first functional group and a third polymeric unit is propagated from the second functional group.

In another embodiment, the present disclosure is directed to a method for making multi-branched polymers. The method includes reacting a hydroxyl functional first polymer with a carboxy functional cyclic carbonate compound to form a carbonate functional macroinitiator compound. The carbonate functional macroinitiator compound is reacted with an amine functional compound to form a macrogenerator compound comprising a carbamate linkage and a hydroxyl group. At least one of a second polymer is propagated from the carbamate linkage and a third polymer is propagated from the hydroxyl functional group.

In yet another embodiment, the present disclosure is directed to a mikto-arm polymer including a poly(ethylene glycol) arm, a central core with a carbamate linkage, and a second arm coupled to the core. The second arm is selected from the group consisting of polyesters, polycarbonates and polylactides. An optional third arm may be connected to the core, and the third arm is a polylactide.

The details of these embodiments are set forth in the accompanying drawings and the description below. Other features, objects, and advantages of the embodiments will be apparent from the description and drawings, and from the claims.

DETAILED DESCRIPTION

This disclosure is directed to a synthetic method for making multi-branched polymer macromolecules such as, for example, a miktoarm polymer. In this method two or three polymeric units can be joined together and propagate outwardly from a central core of a macrogenerator compound.

The polymeric branches emanating from the central core of the macrogenerator compound may include a few monomeric units (also referred to herein as oligomers such as dimers, trimers and tetramers), a plurality of monomeric units (also referred to herein generally as polymers), and/or compounds that themselves have multiple branches. The properties of the resulting co- (AB) and ter- (ABC) polymers can be controlled by selection of the functional groups in the respective branches.

In a first step of this method, a first polymeric unit A is coupled with a functional cyclic compound to form a macro-initiator compound. The macroinitiator compound is a multifunctional agent to which polymeric branches can be added in subsequent reaction steps.

The polymeric unit A can vary widely, and any oligomer or polymer capable of reacting with a selected functional cyclic compound can be used. Suitable examples include polyesters such as polylactide, polyglycolide, polycaprolactone, polyvalerolactone, and the like, polycarbonates, polyethers, functional polystyrenics and (meth)acrylates.

The cyclic moiety on the functional cyclic compound can vary widely depending on the polymeric units B and/or C that will be linked with the polymeric unit A, and any cyclic moiety which can deliver differentiated functionality upon ring opening can be used. Suitable examples include, carbonates of various ring sizes (e.g., 5, 6, 7), lactones or moieties that can be chemically converted to lactones (e.g., cyclic ketones, pyridones), sulfones, cyclic sulfites, and cyclic phosphates that contain additional functionality which can be coupled with the initial polymer A.

The functional groups on the cyclic compound can also vary widely depending on the functionality of the initial polymer A, and suitable functional groups include carboxylates, isocyanates, isothiocyanates, mixed anhydrides, and the like.

In one example shown in Reaction 1 below, an initial polymer A with hydroxyl functionality is reacted with a carboxy functional cyclic carbonate to cap polymeric unit A with cyclic carbonate functionality. The resulting cyclic carbonate compound forms a macroinitiator to which polymeric branches can be added in subsequent reaction steps.

REACTION 1

In Reaction 1 above, the cyclic carbonate compound includes a cyclic moiety derived from a cyclic aliphatic compound reacted with carbonic acid. The cyclic portion of the cyclic carbonate compound preferably is derived from a 5 or 6 membered cyclic aliphatic compound, and in some preferred embodiments the cyclic aliphatic compounds used to form the cyclic carbonate compound have a functional group at the 5 position.

The cyclic carbonate compound further includes a carboxyl group pendant from a carbon atom in the cyclic portion of the molecule. The pendant carboxyl group may vary widely, and may include a variety of functional groups such as, for example, hydroxyl, azido, ethyl, halides, and amines. In some embodiments the carboxyl group includes a single carbon atom directly attached to a carbon atom in the cyclic portion of the molecule. The carbon atom in the cyclic portion where the pendant carboxyl group is attached (see carbon $C_5$ in Reaction 2 below) ultimately forms a central core of the macromolecule to be generated from the synthetic method described herein. The 2-3 polymeric branches joined to the carbonate functional macroinitiator compound in subsequent reaction steps radiate outwardly like branches from the carbon atom $C_5$.

As a more specific example suitable for biomedical applications, in Reaction 1 the initial polymer A may be the compound of Formula 1, a hydroxyl functional oligomer (PEO) derived from monomethylether poly(ethyleneglycol) (PEG). This compound has a weight average molecular weight (Mn) of 3408 g/mol and a PDI of 1.02.

FORMULA 1

To provide a common building block for biocompatible polymers, the compound of Formula 1 may be reacted with the compound of Formula 2, a carboxy functional carbonate compound derived from 2,2-bis(methylol)propionic acid (bis-MPA).

FORMULA 2

A reaction between the compound of Formula 1 and the compound of Formula 2 results in the cyclic carbonate functional macroinitiator compound of Formula 3 below:

FORMULA 3

The cyclic moiety on the macroinitiator compound is then opened with an amine functional compound. Any compound with an amino group can be used to complete this ring opening step, including, for example, amino alcohols including, but not limited to, aliphatic linear amino alcohols, as well as multifunctional branched systems (e.g diethanol amine), hyperbranched and dendritic systems, aminophenols, amine functional peptides and related biomolecules substituted alkoxyamines, functionalized semicarbazides, functionalized hydrazines, aminoalkoxysilanes, amino terminated polymers such as, for example, (meth)acrylates, styrenes, polyethers such as, for example, PEGs, THF, and PPO-Jeffamine, and polybutadienes and the like that can be easily synthesized. The use of preformed polymers as the amine functional compound eliminates the need for an additional polymerization to produce complex polymers such as mikto-systems.

In some embodiments suitable for making biomedically useful macromolecules, an amine functional alkoxy amine, an initiator for controlled radical polymerization (CRP) of a variety of vinyl monomers, can be used as the amine functional compound. Suitable amine functional alkoxy amines include the compound of Formula 4 below, 2,2,5-Trimethyl-3-(1'-p-aminomethylphenylethoxy)-4-phenyl-3-azahexane, as well as amino functional RAFT and ATRP agents. Examples of RAFT and ATRP agents include

FORMULA 4

As another example, suitable amine functional compounds also include amine functional alcohols. Aliphatic linear amine functional alcohols having at least one primary hydroxyl group such as, for example, aminopentanols, have been found to be useful, and 5-amino-1-pentanol has been found to be particularly useful for making biological macromolecules. The hydroxyl groups on the amine functional alcohols can optionally be protected by binding them with other functional groups that chemically and/or sterically prevent reaction with the hydroxyl groups in subsequent reaction steps. The amine functional alcohols can be protected by reacting the alcohols with, for example, a silane compound, to form a protected amine functional alcohol. For example, in some embodiments, the compound of Formula 5, silyl protected 5-amino-1-pentanol, may be used.

FORMULA 5

As shown in Reaction 2 below, reaction of the carbonate functional macroinitiator compound of Reaction 1 above with the amine functional compound opens the cyclic portion of the carbonate group on the macroinitiator and forms a carbamate functional macrogenerator compound. The carbamate functional macrogenerator compound includes two functional groups: (a) a carbamate linkage bearing the functionality (R) of the amino functional compound used in the ring-opening step; and (b) a primary alcohol.

REACTION 2

For example, the macrogenerator compound resulting from reacting the compounds of Formula 3 and Formula 4 is shown in Formula 6 below. This compound has a carbamate linkage and a hydroxyl linkage to facilitate attachment and propagation of additional polymeric branches.

FORMULA 6

As another example, the macrogenerator compound resulting from reacting the compounds of Formula 3 and Formula 5 is shown in Formula 7 below. This compound has a carbamate linkage and a hydroxyl linkage for generation of additional polymeric branches.

FORMULA 7

The ring opening reaction produces a first functional group and a second functional group, and these functional groups create sites where at least one additional polymeric unit may be attached to form a multi-branched polymer. For example, nitroxide mediated polymerization (NMP), atom-transfer radical polymerization (ATRP), reversible addition-fragmentation-transfer (RAFT) polymerization, ring opening polymerization (ROP) or a combination thereof can be used to attach to the first functional group a second polymeric unit B to form a copolymer including polymeric unit A. For example, suitable second polymeric units include, but are not limited to, polyesters, polycarbonates, polylactides and combinations thereof.

In addition, NMP, ATRP, RAFT, ROP or a combination thereof can optionally be used to attach to the second functional group a third polymeric unit C to form a terpolymer including polymeric units A and B. For example, for biological applications, particularly useful third polymeric units include polylactides, although a wide variety of polymeric units may be attached to the second functional group.

For example, referring to Formula 8 below, nitroxide-mediated polymerization (NMP), ring opening polymerization (ROP), or a combination thereof can be used to propagate a second polymeric branch B via the carbamate linkage of the carbamate functional macrogenerator compound. For example, if the amine functional compound used in the ring opening step is an amine functional alkoxy amine of Formula 4, which is an initiator for controlled radical polymerization (CRP) of a wide variety of vinyl monomers, the carbamate linkage bears the CRP initiator and a primary alcohol that can be used for subsequent organocatalytic ROP of cyclic esters, carbonates and the like.

In a second example, if an amine functional alcohol is used in the ring opening step, two hydroxyl groups can be generated on the carbamate linkage of the macrogenerator compound for the ROP of, for example, lactide enantiomers having a variety of stereochemistries, to form a mikto-stereocomplex.

In Formula 8, the carbon atom $C_5$ where the pendant carboxyl group was originally attached to the cyclic portion of the carbonate functional group forms a central core for attachment of additional polymeric branches via the carbamate linkage and/or via the hydroxyl linkage on the macrogenerator compound.

FORMULA 8

Referring again to Formula 8, ROP can be also optionally be used to propagate a third polymeric branch C via the hydroxyl group of the macrogenerator compound. For example, for biological applications ROP of lactides may also be used to propagate a wide variety of polymeric branches from this hydroxyl group.

In summary, functional macro initiators can be used as a key building block for a number of molecular architectures. More precisely, different synthetic routes to AB and ABC mikto-arm polymers can be used. Both NMP and ROP can be used, individually, or in combination, to add additional branches. The generic approach described in this disclosure is both simple and versatile and may provide a useful synthetic platform in the design of complex macromolecular architectures.

EXAMPLES

Two different examples are provided to show the versatility of the synthesis described above to mikto-architectures, although the synthesis is not limited to such applications.

Example 1

In the first example, two disparate polymerization techniques were employed by reaction of the carbonate functional macroinitiator compound with an amine functional alkoxy amine, an initiator for controlled radical polymerization (CRP) of a variety of vinyl monomers. The reaction generated a carbamate linkage on the macrogenerator compound bearing the CRP initiator and a primary alcohol.

In the first step, a hydroxyl functional monomethylether poly(ethyleneglycol) (PEG, Mn 3408 g/mol, PDI 1.02) oligomer (Formula 1 above) was acylated with a carboxy functional cyclic carbonate derived from 2,2-bis(methylol)propionic acid (bis-MPA) (Formula 2 above). The acylation reaction, which resulted in formation of a cyclic carbonate macroinitiator compound, monomethylether-PEG-carbonate (Formula 3 above; Mn 5000 g/mol, PDI 1.02), was conducted using DCC in tetrahydrofuran (THF) at room temperature over 16 hours. The monomethyl ether PEG carbonate was dissolved in 10 mL of dry 0.1 M methylene chloride.

Next, as shown in Reaction 4 below, the ring on the cyclic carbonate macroinitiator compound was opened by adding an amine functional alkoxy amine, 2,2,5-Trimethyl-3-(1'-p-aminomethylphenylethoxy)-4-phenyl-3-azahexane (Formula 4 above) in 0.1 M methylene chloride. The reaction mixture was left under stirring overnight (~14 hours) at room temperature. The crude polymer was purified by polymer precipitation into cold diethyl ether and dried under vacuum until a constant weight was reached. The resulting polymer (Formula 6 above), a carbamate linked controlled radical polymerization (CRP) macroinitiator, was purified by simple precipitation in cold diethyl ether.

Styrene obtained from Sigma-Aldrich, Inc., St. Louis, Mo., was filtered through activated aluminum oxide. The cyclic carbamate compound (product of Reaction 4) (0.45 g, 90 μmol) and 0.7 g (6.75 mmol for a DP of 75) of styrene were charged into a Schlenk-tube. Three pump-freeze-thaw cycles were performed to effectively degas the solution before the reaction vessel was heated to 125° C. The reactants were kept at 125 ° C. for a reaction time yielding ~85% monomer conversion (as judged from $^1$H-NMR analysis). Following the reaction the crude product was cooled to room temperature after which THF was added (~10 ml) and the polymer was purified by precipitation in cold methanol.

L-lactide (targeted DP 35) initiated from the pendent hydroxyl group generated from the ring-opened carbonate precursor was next accomplished at room temperature in methylene chloride using a thiourea/sparteine catalyst/co-catalyst system to generate the ABC miktoarm terpolymer. L-lactide (Bohringer-Ingelheim) was azeotropically distilled form toluene and recrystalized prior to use. The PEG-OH macroinitiator (0.5 g, 0.1 mmol), thiourea catalyst (33 mg, 86.8 μmol), and (−)-sparteine (20.3 mg, 86.8 μmmol) in 1.75 ml of methylene chloride was added to a solution of L-lactide (0.5 g, 3.47 mmol, $[LA]_o/[I]_o$=35) in 0.75 ml of methylene chloride. After 4 hrs of stirring at room temperature, acetic anhydride (51.1 mg, 0.5 mmol) was added and the reaction mixture was stirred overnight at room temperature. The following morning the crude polymer was purified by precipitation into cold diethyl-ether.

The resulting ABC terpolymer is shown in Formula 9 below:

TABLE 1

Characterization of PEG-PS-P(L)LA and PEG-PLA Mikto-arm Terpolymers

| | Structure | |
|---|---|---|
| | $M^1_n$ (g/mol) | $PDI^1 = M_w/M_n$ |
| Example 1 | | |
| PEG | 3408 | 1.02 |
| PEG-PS | 9217 | 1.16 |
| PEG-PS-P(L)LA | 15,178 | 1.15 |
| Example 2 | | |
| PEG-P(L)LA-P(L)LA | 16,490 | 1.09 |
| PEG-P(D)LA-P(D)LA | 15,884 | 1.09 |
| PEG-racPLA-racPLA | 14,984 | 1.09 |
| PEG-P(L)LA | $9200^2$ | 1.07 |
| PEG-P(L)LA-P(D)LA | $14,524^2$ | 1.07 |

$^1$From GPC measurements.
$^2$From $^1$H-NMR end-group analysis.

Moreover, the molecular weight increased from ~3 400 g/mol to 15 000 g/mol, consistent with the targeted molecular weights for each of the blocks (Table 1).

The $^1$H-NMR spectra of the terpolymer (FIG. 1) clearly shows the expected peaks from each of the blocks together with their respective end-groups (PEG methoxy metyl singlet at 3.40 ppm, PS alkoxyamine at 1.0-0.5 ppm (t-butyl group), and PLA end-group quartet at ~4.35 ppm). These data together with the GPC results demonstrate the feasibility of this approach.

FORMULA 9

Gel permeation chromatography (GPC) and $^1$H-NMR (FIG. 1) spectroscopy were used to follow each of these transformations. NMR-spectra were recorded on a Bruker Avance 2000 ($^1$H NMR@400 MHz, $^{13}$C NMR@100 MHz), and GPC was performed on a Waters chromatography instrument connected to a Waters 410 differential refractometer using THF as eluent. The GPC's clearly show clean and quantitative transformations with no evidence of homopolymer contamination as demonstrated by the narrow, monomodal molecular weight distributions (Table 1).

Example 2

To further demonstrate the efficacy of the ring-opening of carbonate functional PEG oligomers to generate interesting and complex architectures, a second series of experiments were designed to exploit the different enantiomers of lactide. Aminopentanol or a protected aminopentanol was reacted with a macroinitiator formed by Reaction 1, generating two hydroxyl groups for the ROP of lactide having different stereochemistry and possible mikto-stereocomplexes. The mechanical and thermal properties of polylactide are strongly coupled to the stereochemistry that exists as poly(L-lactide) (L-PLA or P(L)LA), poly(D-lactide) (D-PLA or P(D)LA) and poly(rac-lactide) (rac-PLA).

Example 2A

The carbonate functional monomethyl ether PEG described in Example 1 above was dissolved in 10 ml of 0.1 M dry methylene chloride, and subsequently ring opened with aminopentanol to give two primary alcohols capable of the ring opening polymerization (ROP) of lactide. Purification of the crude polymer macrogenerator was accomplished by polymer precipitation as described in Example 1 above.

L-lactide, D-lactide, and rac-lactide (Bohringer-Ingelheim) were azeotropically distilled form toluene and recrystalized prior to use. From the two primary alcohols in the macrogenerator described above, either L-, D- or rac-lactide were polymerized in methylene chloride using thiourea/sparteine catalyst mixtures in near quantitative conversion of monomer to polymer to give Y-shaped polymers of L-PLA, D-PLA, and rac-PLA, respectively. The molecular weight of the carbonate-functional PEG increased from ~5000 g/mol to ~15,000 g/mol for the Y-shaped copolymers and the polydispersities were narrow (PDI<1.10) with no evidence of homopolymer contamination (Table 1).

As a control, a di-block copolymer prepared by the initiation of L-lactide (DP 35) from the monomethylether PEG was analyzed in the GPC together with the Y-shaped co-polymer. As expected, the GPC shows two distributions with the PEG-PLA block copolymer having the lower molecular weight.

Example 2B

Silyl protected 5-amino-1-pentanol (Formula 5 above) was prepared by adding 5-amino-1-pentanol (10 g, 96.9 mmol, 1 eq), imidazole (9.90 g, 145.4 mmol, 1.5 eq), and 150 ml of methylene chloride to a flask and cooling to 0° C. tert-Butyl (chloro)dimethylsilane (21.9 g, 145.4 mmol, 1.5 eq) in 50 ml of methylene chloride was added to the flask dropwise. Once added the reaction mixture was warmed to room temperature and allowed to stir for 4 hr. The mixture was then heated to 40° C for an additional 2 hr. Purification was performed by first washing with brine solution and then by column chromatography using pure ethyl acetate.

About 5 mmol (5 eq) of the tert-butyldimethylsilyl protected aminopentanol was added to the carbonate functional monomethylether PEG of Example 1, and the reaction mixture left under stirring overnight (~14 hours) at room temperature. The crude polymer was purified by polymer precipitation into cold diethyl ether and dried under vacuum until a constant weight was reached. As shown in Reaction 4 below, this step generated a primary alcohol and a protected alcohol on ring-opening.

REACTION 4

The ROP of L-lactide (target DP=35) initiated from the primary alcohol of the macrogenerator was accomplished in methylene chloride in the presence of thiourea/sparteine. The PEG-OH macroinitiator (0.5 g, 0.1 mmol), thiourea catalyst (33 mg, 86.8 μmol), and (−)-sparteine (20.3 mg, 86.8 μmmol) in 1.75 ml of methylene chloride was added to a solution of L-lactide (0.5 g, 3.47 mmol, $[LA]_o/[I]_o=35$) in 0.75 ml of methylene chloride. After 4 hrs of stirring at room temperature, upon quantitative monomer conversion acetic anhydride (51.1 mg, 0.5 mmol) was added to generate a methyl ester end-group, and the reaction mixture was stirred overnight at room temperature. The following morning the crude polymer was purified by precipitation into cold diethyl-ether.

REACTION 5

40

The catalyst used to facilitate polymerization also effected the capping of the end-group with acetic anhydride. The $^1$H-NMR spectrum confirmed the structure as the quartet at ~4.35 ppm was completely removed. Isolation of this two-step, one-pot synthesis by precipitation produced a narrowly dispersed di-block copolymer with predictable molecular weight and end-group fidelity.

The PEG-P(L)LA macrogenerator (0.75 g, 75 umol) was dissolved in 5 ml of methylene chloride and purged with $N_2$. To remove the tert-butyldimethylsilyl protecting group, boron trifluoride diethyl etherate (0.5 ml, 4.05 mmol) was added under $N_2$ to the reaction flask and the mixture was sealed under $N_2$ and stirred at 40° C. overnight. Purification the next morning was performed by precipitation into cold diethyl ether. The reaction is shown below as Reaction 6:

REACTION 6

Figure 1:
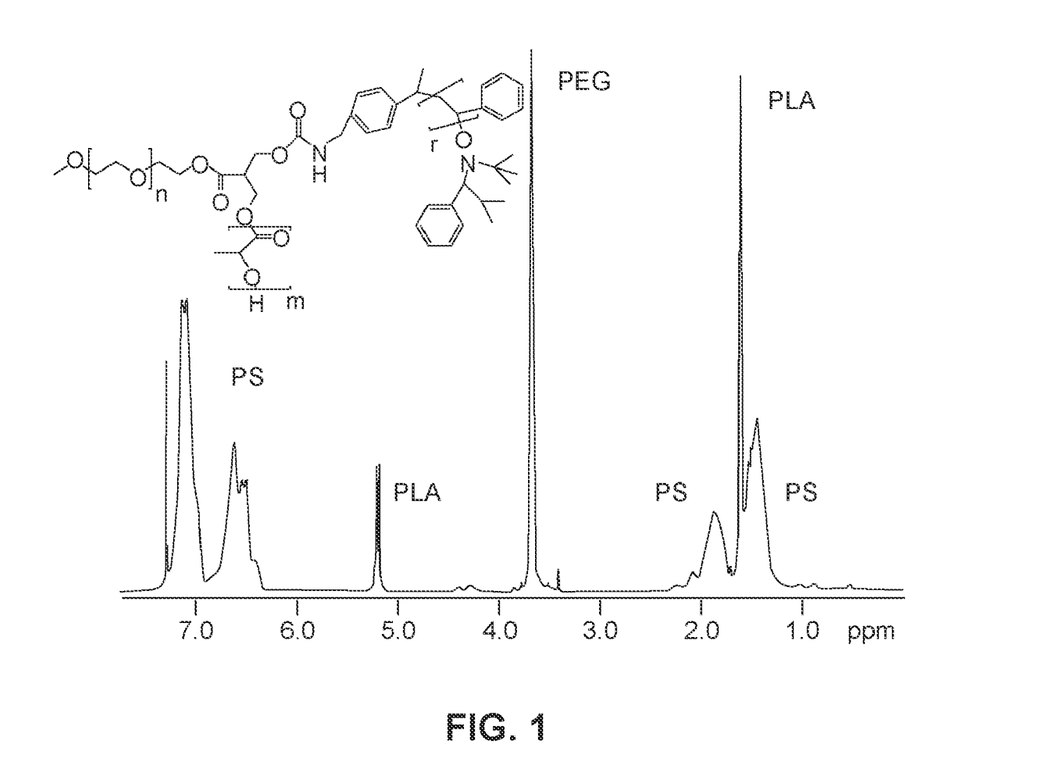
FIG. 1 is a $^1$H-NMR (CDCl$_3$) plot of a PEG-PS-PLA ABC mikto-arm terpolymer.
Figure 2:
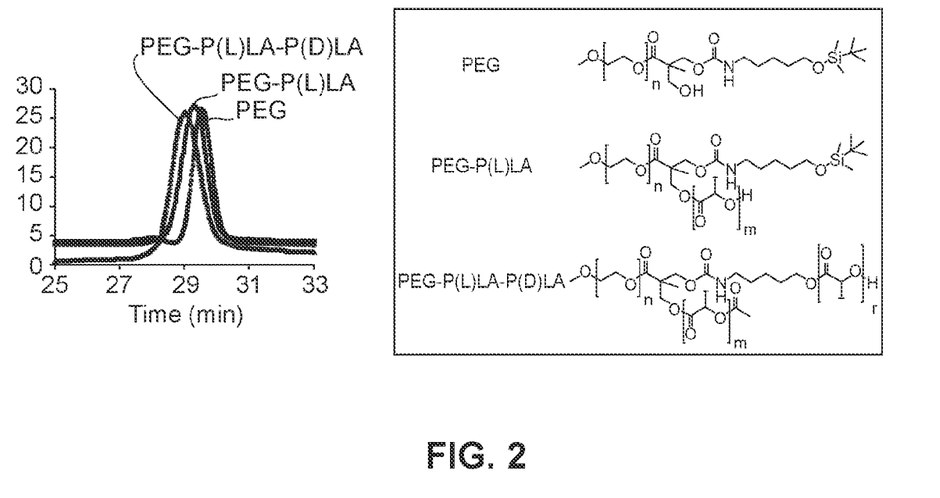
FIG. 2 is a GPC curve of a PEG-P(L)LA-P(D)LA (▲) ABC mikto-arm terpolymer and corresponding PEG (♦) and PEG-P(L)LA (■) macro initiators. The inset shows the respective molecular structures.

Removal of the tert-butyldimethylsilyl protecting group generated an alcohol at the block junction that was used to initiate the second ROP of D-lactide with a targeted DP of 35 in methylene chloride using thiourea/sparteine yielding a mikto-arm stereoblock copolymer. The PEG-PLLA-OH macrogenerator (0.5 g, 0.05 mmol), thiourea catalyst (16.5 mg, 43.4 μmol), and (−)-sparteine (10.2 mg, 43.4 μmol) in 0.75 ml of methylene chloride was added to a solution of D-lactide (0.25 g, 1.74 mmol, $[LA]_o/[I]_o=35$) in 0.375 ml of methylene chloride The reaction mixture was stirred at room temperature for 4 hr and precipitated into cold methanol to purify. The procedure is identical when polymerizing lactide from PEG-PS-OH macrogenerator and for $^1$H-NMR characterization (FIG. 1). The reaction is shown below as Reaction 7:

GPC was used to demonstrate the successful chain extension between each transformation, and the results are shown in FIG. 2.

Figure 3:
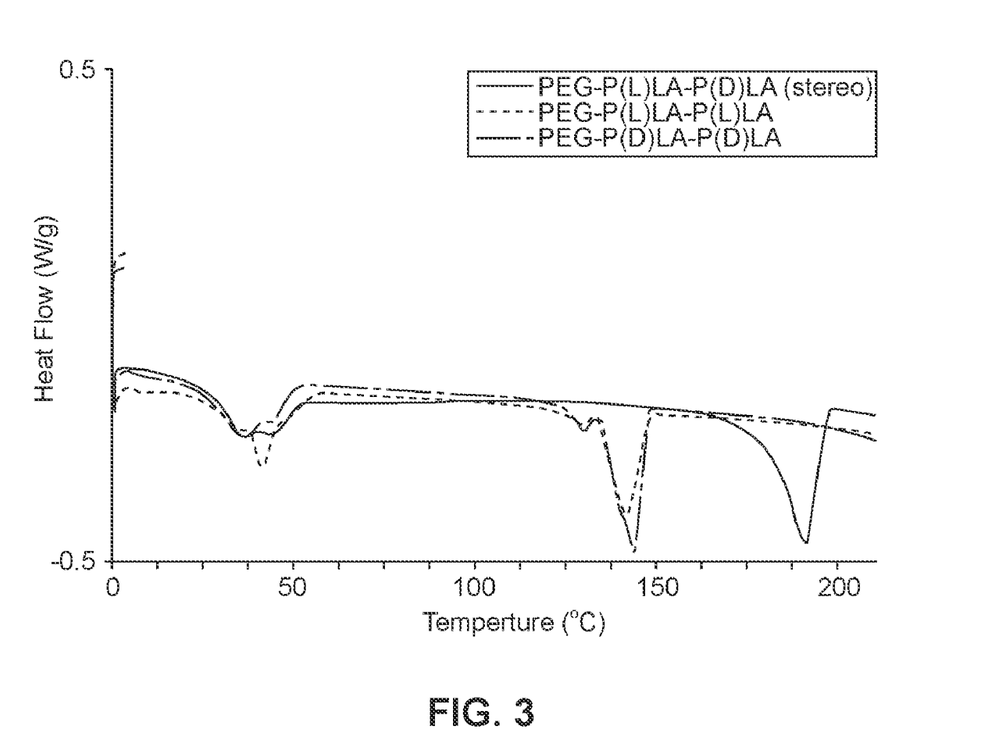
FIG. 3 is a DSC thermo gram of a PEG-P(L)LA-P(D)LA stereo complex (solid), a corresponding PEG-P(L)LA-P(L)LA (short dash), and a PEG-P(D)LA-P(D)LA (dash dot) mikto-arm polymers.

Differential scanning calorimetry (DSC) was used to support the presence of the D/L-PLA stereo complex, and the results are shown in FIG. 3. Differential Scanning Calorimetry (DSC) was measured on a TA Instrument Q1000. More precisely, the DSC thermo gram of the PEG-P(L)LA-P(D)LA stereo complex in FIG. 3 shows a melting transition (Tm) at ~185° C. that is well above the corresponding Tm of PEG-P(L)LA-P(L)LA and PEG-P(D)LA-P(D)LA at ~145° C. In all thermo grams the melting of PEG can also be observed at ~45° C.

REACTION 7

Various embodiments of the invention have been described. These and other embodiments are within the scope of the following claims.

What is claimed is:

1. A method for making a multi-branched polymer, comprising:
reacting a first polymeric unit with a functional cyclic compound to form a functional macroinitiator compound with a cyclic moiety;
reacting the functional macroinitiator compound with an amine functional compound to open the cyclic moiety and form a first functional group and a second functional group; and
propagating at least one of a second polymeric unit from the first functional group and a third polymeric unit from the second functional group to form the branched polymer.

2. The method of claim 1, wherein the first polymeric unit is selected from the group consisting of polyesters, polycarbonates, polyethers, functional polystyrenics, (meth)acrylates and combinations thereof.

3. The method of claim 1, wherein the functional cyclic compound comprises a functional group selected from the group consisting of carboxylates, isocyanates, isothiocyanates, anhydrides, and combinations thereof.

4. The method of claim 1, wherein the cyclic moiety is derived from at least one of a cyclic carbonate, a lactone, a cyclic sulfite, a cyclic phosphate, sulfones and a lactone precursor compound selected from the group consisting of cyclic ketones, pyridones, and sulfones.

5. The method of claim 4, wherein the cyclic moiety is derived from a cyclic carbonate.

6. The method of claim 5, wherein the cyclic carbonate comprises a 5-7 membered ring.

7. The method of claim 6, wherein the cyclic carbonate further comprises a carboxyl functional group.

8. The method of claim 1, wherein the amine functional compound is selected from the group consisting of amino alcohols, diethanol amine, aminophenols, alkoxyamines, semicarbazides, hydrazines, aminoalkoxysilanes, amino terminated polymers, polyethers, polybutadienes and combinations thereof.

9. The method of claim 8, wherein the amino alcohol comprises an aliphatic linear amino alcohol.

10. The method of claim 9, wherein the amino alcohol is aminopentanol.

11. The method of claim 10, wherein the aminopentanol comprises a protected hydroxyl group.

12. A method for making multi-branched polymers, comprising:
reacting a hydroxyl functional first polymer with a carboxy functional cyclic carbonate compound to form a carbonate functional macroinitiator compound;
reacting the carbonate functional macroinitiator compound with an amine functional compound to form a macrogenerator compound comprising a carbamate linkage and a hydroxyl group; and
propagating at least one of a second polymer from the carbamate linkage and a third polymer from the hydroxyl functional group.

13. The method of claim 12, wherein the a carboxyl functional cyclic carbonate compound is derived from 2,2-bis(methylol)propionic acid (bis-MPA).

14. The method of claim 12, wherein the a hydroxyl functional first polymer comprises an oligomer derived from monomethylether poly(ethyleneglycol) (PEG).

15. The method of claim 12, wherein the amine functional compound comprises one of an amine functional alkoxy amine and an amine functional alcohol.

16. The method of claim 12, wherein the second polymer is propagated at the carbamate linkage by at least one of controlled radical or ring opening polymerization (ROP).

17. The method of claim 12, wherein the third polymer comprises a polylactide.

18. The method of claim 12, wherein the second polymer is selected from polystyrene or polylactide.

19. A mikto-arm polymer comprising a poly(ethylene glycol) arm, a central core comprising a carbamate linkage, and a second arm coupled to the core, wherein the second arm is selected from the group consisting of polyesters, polyolefins, polycarbonates, and polylactides.

20. The mikto-arm polymer of claim 19, wherein the polyolefin is polystyrene (PS).

21. The mikto-arm polymer of claim 19, wherein the polylactide is selected from the group consisting of poly(L-lactide), poly(D-lactide), poly(rac-lactide) and combinations thereof.

22. The mikto-arm polymer of claim 19, further comprising a third arm attached to the central core, wherein the third arm is selected from the group consisting of polyesters, polycarbonates, and polylactides.

* * * * *

UNITED STATES PATENT AND TRADEMARK OFFICE
CERTIFICATE OF CORRECTION

PATENT NO. : 8,013,065 B2  Page 1 of 1
APPLICATION NO. : 12/481477
DATED : September 6, 2011
INVENTOR(S) : James L. Hedrick et al.

It is certified that error appears in the above-identified patent and that said Letters Patent is hereby corrected as shown below:

Column 1, line 8, "CHE-064891" should read --CHE-0645891--.

Signed and Sealed this
Third Day of April, 2012

David J. Kappos
*Director of the United States Patent and Trademark Office*